United States Patent [19]

Fujiwara

[11] Patent Number: 5,691,825
[45] Date of Patent: Nov. 25, 1997

[54] OPTICAL IMAGE SCANNER

[75] Inventor: Tatsuo Fujiwara, Kawasaki, Japan

[73] Assignee: Fujitsu Limited, Kawasaki, Japan

[21] Appl. No.: 707,979

[22] Filed: Aug. 30, 1996

Related U.S. Application Data

[62] Division of Ser. No. 265,029, Jun. 24, 1994, Pat. No. 5,592,308.

[30] Foreign Application Priority Data

Sep. 17, 1993 [JP] Japan ................. 5-231559

[51] Int. Cl.⁶ ............... H04N 1/00; H04N 1/04; H01J 3/14; G03G 15/28
[52] U.S. Cl. ............... 358/497; 358/482; 358/474; 358/494; 250/234; 399/208
[58] Field of Search ............... 358/497, 406, 358/482, 494, 483, 474; 250/234, 235; 399/208; 382/321, 323

[56] References Cited

U.S. PATENT DOCUMENTS

| | | | |
|---|---|---|---|
| 3,886,371 | 5/1975 | Lloyd | 358/497 |
| 4,586,808 | 5/1986 | Tanimoto et al. | 355/235 |
| 4,603,963 | 8/1986 | Hinton et al. | 355/235 |
| 4,620,234 | 10/1986 | Watanabe | 358/497 |
| 4,660,957 | 4/1987 | Ueda et al. | 355/233 |
| 4,704,638 | 11/1987 | Igarashi | 358/296 |
| 4,763,166 | 8/1988 | Watanabe | 355/14 SH |
| 4,779,141 | 10/1988 | Watanabe | 358/497 |
| 4,870,448 | 9/1989 | Miyake et al. | 355/235 |
| 5,012,354 | 4/1991 | Tsuchiya | 358/474 |
| 5,097,290 | 3/1992 | Watanabe | 355/235 |
| 5,150,227 | 9/1992 | Koshiyouji et al. | 358/497 |
| 5,191,377 | 3/1993 | Kagiura et al. | 355/235 |
| 5,251,039 | 10/1993 | Kusumoto et al. | 358/497 |
| 5,451,777 | 9/1995 | Blake et al. | 250/234 |

FOREIGN PATENT DOCUMENTS

| | | |
|---|---|---|
| 35 21 514 | 12/1985 | Germany . |
| 36 32 790 | 9/1987 | Germany . |
| 61-201229 | 9/1986 | Japan . |
| 2-246674 | 10/1990 | Japan . |

Primary Examiner—Edward L. Coles, Sr.
Assistant Examiner—Kimberly A. Williams
Attorney, Agent, or Firm—Staas & Halsey

[57] ABSTRACT

In a two-carrier type image scanner, a first carrier (10) is moved in parallel to a document surface at a scanning speed and a second carrier (20) is moved at half the scanning speed, the image scanner optically reading out image information such as figures and characters on the document surface using an optical system mounted on the two carriers. To permit the adjustment of the carrier in the roll direction to be easily conducted, one side of each of the carriers (10, 20) is movably engaged with a fixed guide shaft (46), and the other side is guided by a bearing (53) which rolls on a fixed guide rail (47) disposed in parallel with the guide shaft (46), wherein the carrier is capable of being adjusted in the roll direction with respect to the guide shaft (46) when a position of the bearing (53) with respect to the carrier is adjusted.

24 Claims, 9 Drawing Sheets

OPTICAL IMAGE SCANNER

This application is a division of application Ser. No. 08/265,029, filed Jun. 24, 1994, now U.S. Pat. No. 5,592,308.

BACKGROUND OF THE INVENTION

1. Field of the Invention

The present invention relates to an image scanner, and more particularly relates to an image scanner having a mechanism by which the movement of a carrier can be stabilized so as to prevent the deviation of the carrier.

2. Related Art

An image scanner reads out image information such as figures and characters expressed on a document placed on a platen while the document is optically scanned. Concerning the mechanism of the image scanner, there are two types of image scanners. One is a one-carrier type image scanner in which an optical system composed of a light source (lamp), mirror and lens, CCD and drive circuit are mounted on one carrier, and this carrier is moved in parallel to a document surface at a scanning speed. The other is a two-carrier type image scanner in which a lens and CCD reading circuit are fixed to a frame of the image scanner, and its optical system composed of a light source (lamp) and mirror is divided into two and mounted on two different carriers, and the first carrier is moved in parallel to the document surface at a scanning speed and the second carrier is moved at half the scanning speed of, but in the same direction as, the first carrier.

The two-carrier type image scanner is advantageous in that: the number of parts to be mounted on each carrier is small; the construction is simple; the image scanner is light in weight; and the response of each carrier is high. However, it is difficult to accurately assemble and adjust the two carriers in order to move them along the optical axis so that the length of the optical axis can be maintained constant at all times. Further, since the two carriers must be driven at different speeds, the construction of the drive system becomes complicated. Furthermore, when each carrier is accelerated or decelerated, the formed image tends to be blurred by the deviation of each carrier caused when it is driven.

On the other hand, in the one-carrier type image scanner, the optical system including the light source, mirror and lens, and the CCD are mounted on one carrier, and this carrier must be moved in parallel to the document surface at the scanning speed. Accordingly, the construction of the carrier becomes complicated, the weight is increased, the response is low, and it takes time to accelerate the carrier to a predetermined speed. However, in this case, there is only one carrier. Therefore, this carrier is advantageous in that the adjustment of the optical passage length and also adjustment of the optical axis may be conducted on a single carrier.

The one-carrier type and two-carrier type image scanners have the following common problem. A skew of the carrier with respect to the image surface, that is, an inclination or deviation of the carrier, must be adjusted.

SUMMARY OF THE INVENTION

It is an object of the present invention to provide an image scanner in which the roll of a carrier can be easily adjusted in both the one-carrier type and two-carrier type image scanners.

It is another object of the present invention to provide an image scanner in which not only the roll direction but also the pitch and yaw of a carrier, which are conventionally adjusted by a wire, are adjusted in the assembly process by a means for suppressing the deviation so that the accuracy can be easily improved in the assembly and operation processes.

In order to accomplish the above objects, the present invention provides an image scanner which optically reads out image information such as figures and characters on a document surface using an optical system mounted on at least one of the carriers movable with respect to the image scanner body, the image scanner characterized in that: one side of each of said carriers is movably engaged with a fixed guide shaft extending in the moving direction of the carrier; and the other side is guided by a bearing which rolls on a fixed guide rail disposed in parallel with the guide shaft, wherein the carrier is capable of being adjusted in the roll direction with respect to the guide shaft when a position of the bearing with respect to the carrier is adjusted.

By a simple method of adjusting the bearing position with respect to the carrier, deviation of the carrier in the roll direction can be simply adjusted with respect to the guide shaft.

Also, the present invention is to provide a two-carrier type image scanner in which a first carrier is moved along a document surface at a scanning speed and a second carrier is moved at half the scanning speed, the image scanner optically reading out image information such as figures and characters on the document surface using an optical system mounted on the carriers, the image scanner characterized in that: one side of each of the carriers is movably engaged with a fixed guide shaft extending in the moving direction of the carrier; and the other side is guided by a bearing which rolls on a fixed guide rail disposed in parallel with the guide shaft, wherein one of the two carriers is capable of being adjusted in the roll direction with respect to the guide shaft when the position of the bearing with respect to the carrier is adjusted.

Concerning one of the carriers, by a simple method in which the position of the carrier in the roll direction with respect to the guide shaft is adjusted, the relative deviation caused between the first and second carriers can be simply adjusted.

Also, the present invention is to provide a two-carrier type image scanner, wherein each of the carriers includes pinch rollers coming into contact with the fixed guide shaft, the pinch rollers being disposed at an engaging portion of the carrier where the carrier engages with the fixed guide shaft, and the deviation of the carrier in the yaw and pitch directions is suppressed when the pinching loads of these pinch rollers with respect to the fixed guide shaft are adjusted.

By a simple method in which the pinch load of the pinch roller with respect to the fixed guide is adjusted, deviation of the carrier in the yaw and pitch directions can be suppressed.

DETAILED DESCRIPTION OF THE INVENTION

Figure 1:
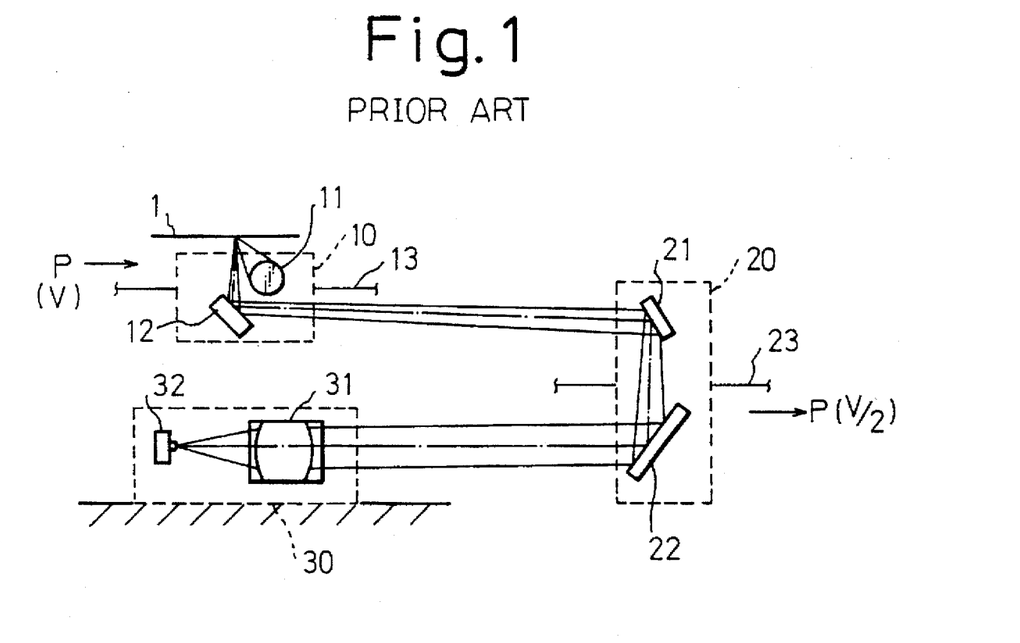
FIG. 1 is a schematic illustration showing the conventional two-carrier type image scanner.

FIG. 1 is a schematic illustration of the conventional two-carrier type image scanner which is disclosed, for example, in Japanese Unexamined Patent Publication (Kokai) No. 61-201229. In FIG. 1, a light source (lamp) 11 and mirror 12 are mounted on a first carrier 10 which is driven by a wire 13. Two mirrors 21, 22 are mounted on a second carrier 20 which is driven by a wire 23. A lens 31, CCD 32 and drive circuit thereof are fixed to a stationary frame 30. A beam of light emitted from the light source 11 is incident on a surface 1 of a document or media. The beam of light reflected by the document surface 1 is further reflected by the mirror 12 on the first carrier 10, and by the mirrors 21, 22 on the second carrier. Then an image is formed on the CCD 32 when the beam of light passes through a lens 31 disposed on the fixed frame 30. In order to form an image on the CCD 32 using the beam of light sent from the document surface 1, the length of the optical path from the document surface 1 to the CCD 32 must be maintained constant at all times. Therefore, in the case where the first carrier 10 is moved along the document surface 1 in the direction of arrow P at the speed of V, it is necessary to move the second carrier 20 in the same direction as that of the first carrier 10 as shown by an arrow P at the speed of V/2. Accordingly, the wires 13, 23 are connected with an appropriate drive source (not shown in the drawings) so that the first and second carriers 10, 20 can be respectively moved at the speeds of V and V/1.

Figure 2:
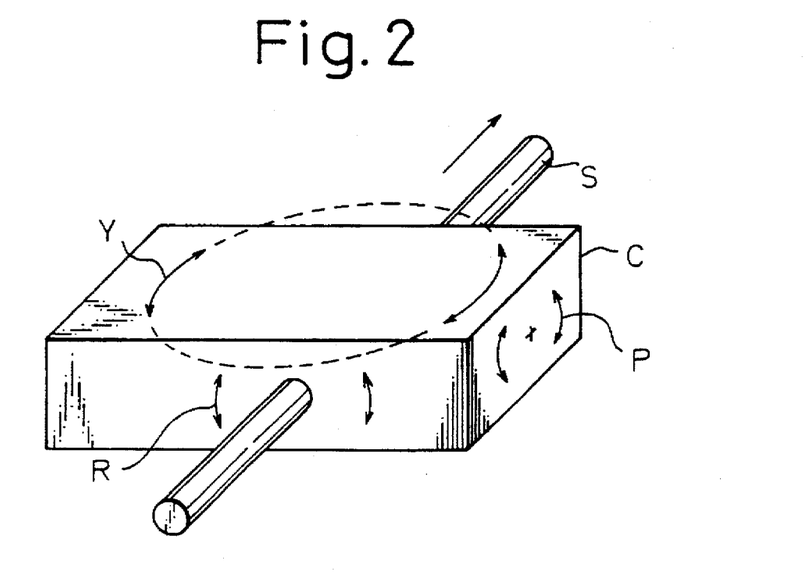
FIG. 2 is a schematic illustration showing the directions of deviation caused in the carrier of an image scanner.

As illustrated in FIG. 2, unless roll R with respect to the shaft (the direction of the shaft is the same as the progressive direction) is correctly adjusted with respect to the progressive direction S of the carrier C, and unless pitch P around a horizontal axis perpendicular to the shaft and yaw Y around a vertical axis perpendicular to the shaft are suppressed, the formed image is blurred.

Figure 3A:
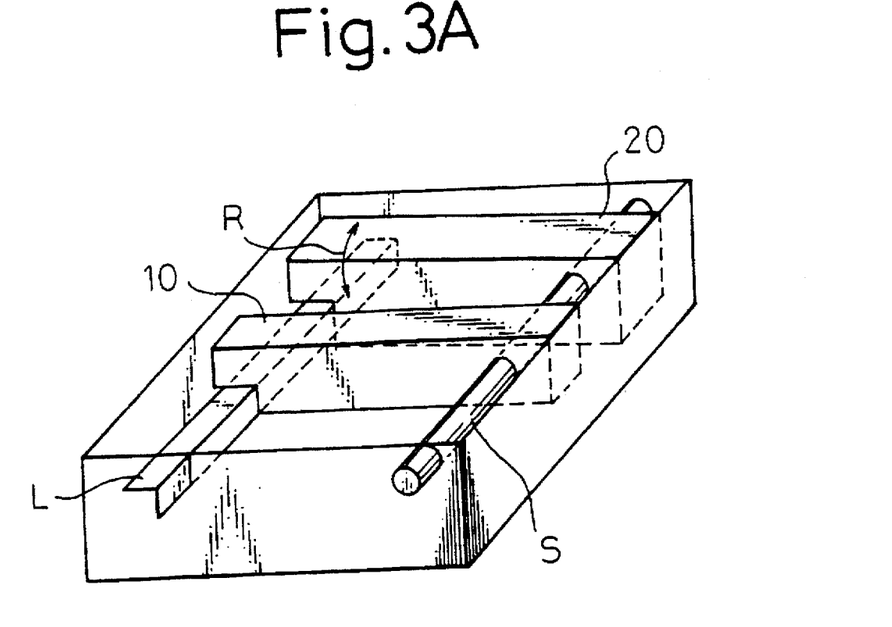
FIGS. 3A and 3B are schematic illustrations for explaining the skew adjustment in one-carrier type and two carrier type image scanners of the present invention.

FIG. 3A shows a skew adjusting direction of the carrier of the two-carrier type image scanner. In this case, the deviation of a rotational direction, that is, roll R is adjusted with respect to the shaft S disposed in the travel direction of the first and second carriers 10, 20. The first and second carriers 10, 20 are supported by the shaft S and rail L disposed parallel to the progressive direction. On the side of rail L, a contact position of at least one of the carriers (the second carrier 20) is adjusted.

Figure 3B:
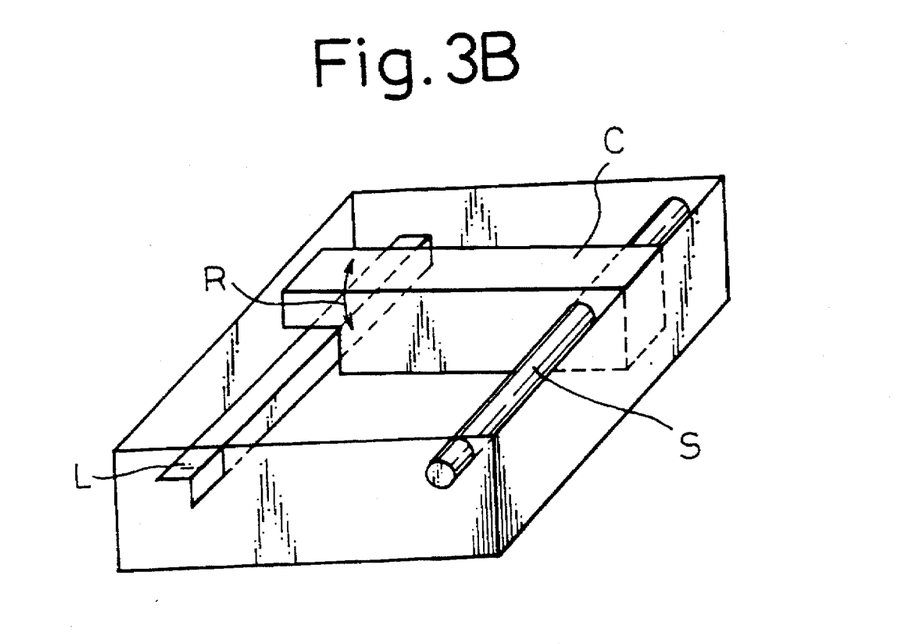

FIG. 3B shows a skew adjusting direction of the carrier in the one-carrier type image scanner. The single carrier C is supported by the shaft S of and rail L and adjusted in the rolling direction R, in the same manner as the above. The explanations hereinafter are mainly directed to the two-carrier type image scanner. It should be considered, however, that these technical solutions can also be applicable to the one-carrier type image scanner.

Figure 4:
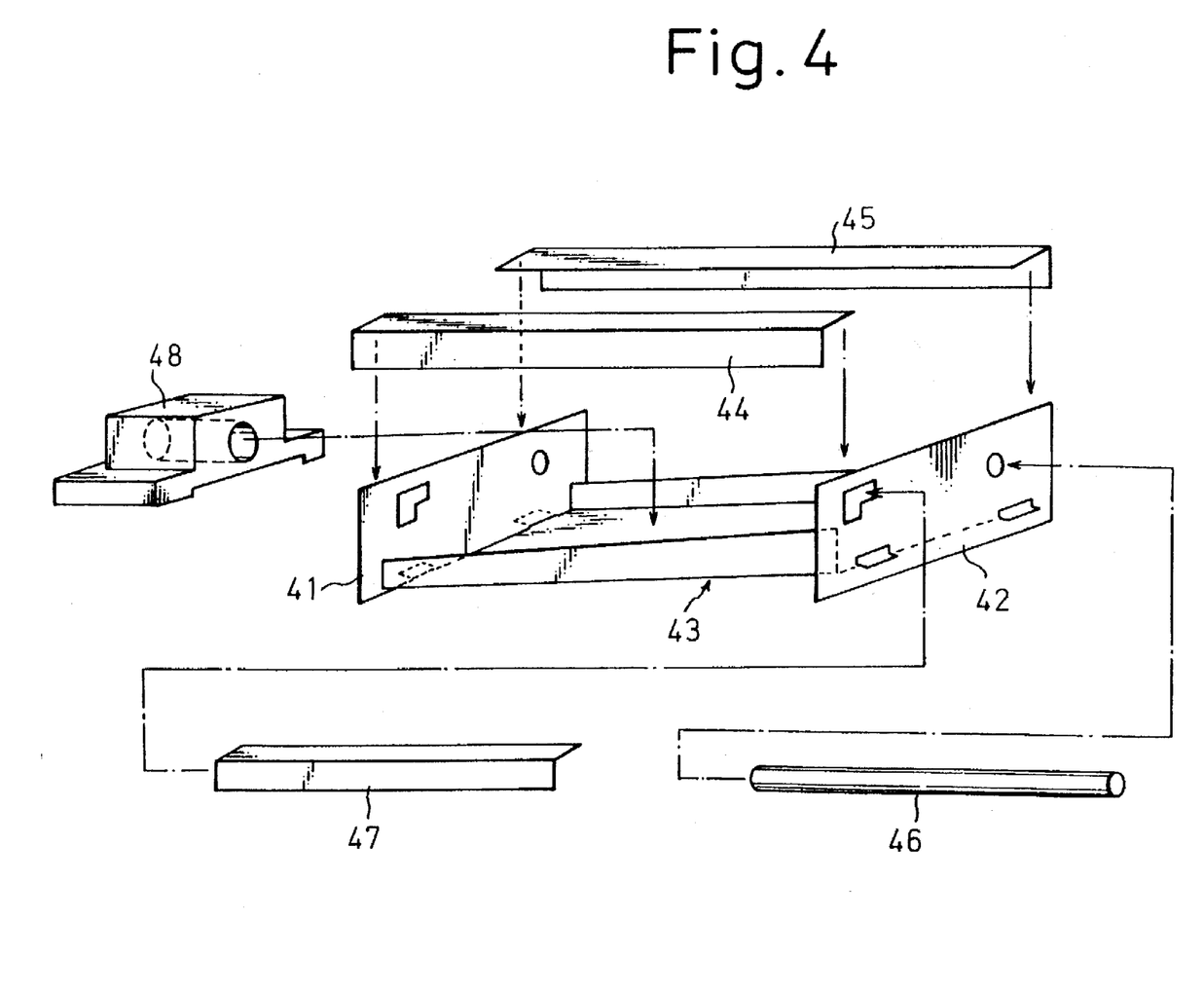
FIG. 4 is an exploded view of the frame portion of the image scanner.
Figure 5:
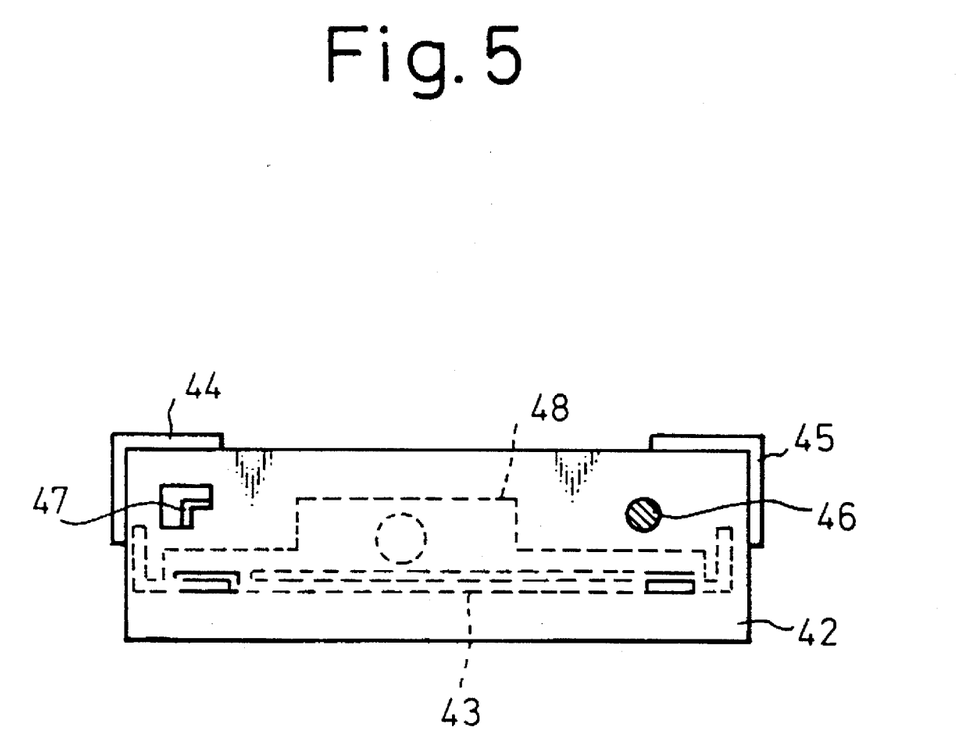
FIG. 5 is an assembly view of the frame portion of the image scanner shown in FIG. 4.

FIG. 4 is an exploded view of the frame of the image scanner, and FIG. 5 is an assembly view of the frame of the image scanner. First, a bottom plate 43 is attached to front and rear end plates 41, 42 which are disposed in parallel, in such a manner that protrusions of the bottom plate 43 are inserted into reference holes of the end plates 41, 42. At the same time, the L-shaped members 44, 45 are attached to the right and left upper corners of the end plates 41, 42, in such a manner that the members 44, 45 are set on a reference surface. Then these members are fixed. After that, a shaft 46 is inserted into the reference circular holes of the end plates 41, 42, and an L-shaped guide rail 47 is inserted into the reference L-shaped holes of the end plates 41, 42, in such a manner that these members are set on the reference surfaces. Although the carriers are not shown in FIGS. 4 and 5, in the case of the two-carrier type image scanner, after the skew and magnification of the lens and CCD unit 48 have been adjusted on a jig (not shown in the drawings), they are attached and fixed to the frame. Concerning the document surface, a platen glass (not shown in the drawings) is attached on the basis of the upper surfaces of the upper L-shaped members 44, 45. The carriers (not shown in the drawings) are movably attached in such a manner that the carriers straddle the shaft 46 and guide angle 47 as described later.

Figure 6:
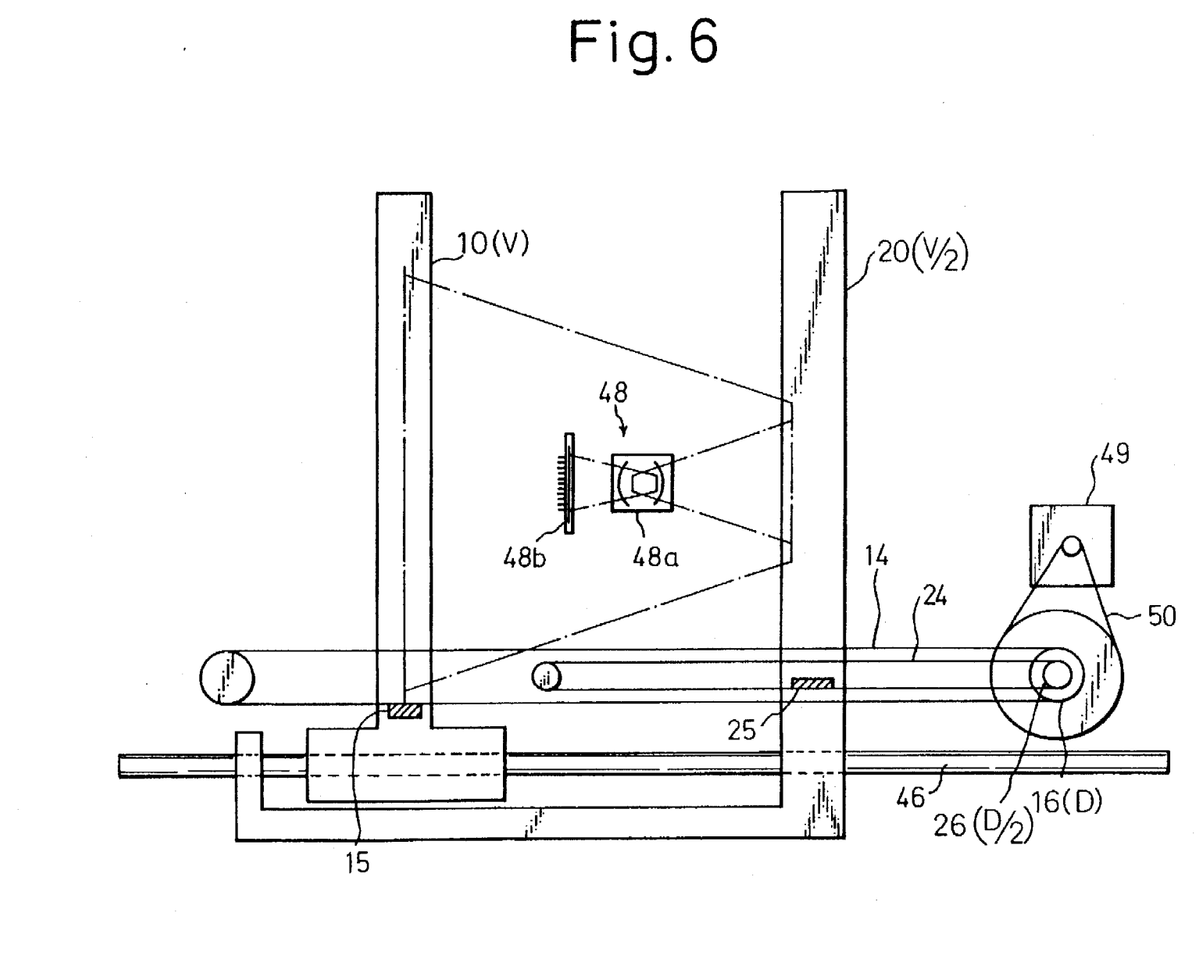
FIG. 6 is a view showing the drive mechanism of the carrier of the two-carrier type image scanner.

FIG. 6 is a plan view showing a carrier drive mechanism of the image scanner. In the example shown in FIG. 6, the first carrier 10 is approximately formed into a T-shape, and the base end portion of the first carrier 10 is guided by the guide shaft 46. On the other hand, the second carrier 20 is approximately formed into an L-shape, and two spaced portions of the base end thereof are guided by the guide shaft 46 in such a manner that the two spaced portions of the base end of the second carrier 20 straddle the base end portion of the first carrier 10 along the guide shaft 46. The first and second carriers 10, 20 are respectively fixed to timing belts 14, 24 through fixing members 15, 25. These timing belts 14, 24 are connected to a drive motor 49 through drive pulleys 16, 26, respectively, and the drive pulley 16 has a diameter of D and on the other hand the drive pulley 26 has a diameter of D/2, so that the first carrier 10 can be moved along the guide shaft 46 at the speed of V, and the second carrier 20 can be moved along the guide shaft 46 at the speed of V/2. As described before, the optical system (not shown), including the light source (lamp) and mirror, is mounted on the first carrier 10, and the optical system (not shown), including the mirrors is also mounted on the second carrier 20, so that a document (not shown) is read out by the action of the lens and CCD unit 48 fixed to the frame. In this connection, numeral 48a is a lens system, and numeral 48b is a line sensor.

In the conventional two-carrier type image sensor, for example, in the image sensor disclosed in Japanese Unexamined Patent Publication (Kokai) No. 61-201229, transmission belts are provided on both sides of each carrier, so that four transmission belts are provided in total, and the guide rail and shaft are combined, and two rails are provided. Also, the wires are attached onto both sides of each carrier, so that the two carriers are driven at four positions in total.

According to the construction shown in FIG. 6, some assembly and adjustment work can be omitted as compared with the conventional one, and further the image scanner can be constructed from simpler parts than the conventional ones. Consequently, the cost of the image scanner can be reduced. Further, the image scanner can be quickly stopped and started, which is difficult for the conventional two-carrier type image scanner.

Figure 7:
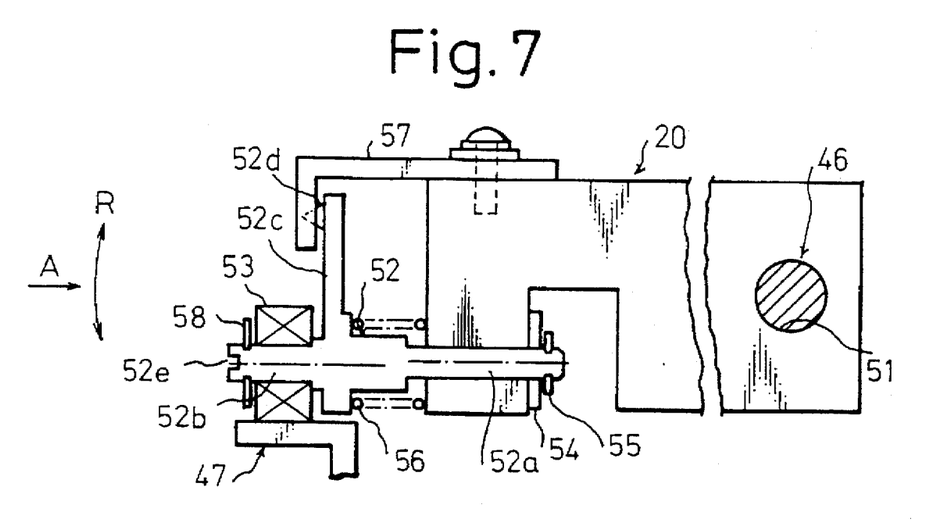
FIG. 7 is a view showing the skew adjustment mechanism of the carrier of the present invention.
Figure 8:
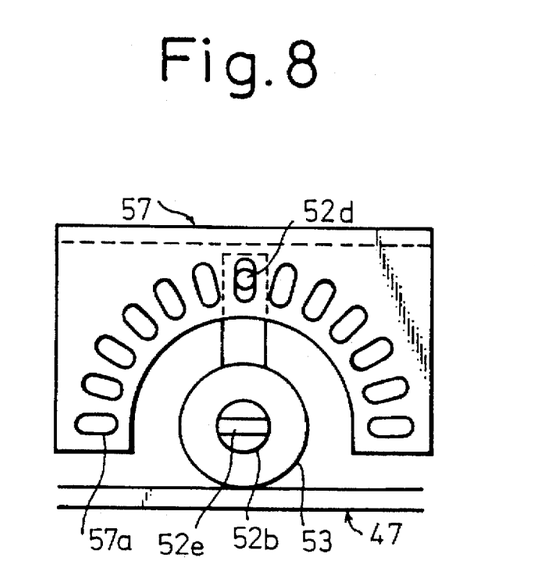
FIG. 8 is a view showing the skew adjustment mechanism, wherein the view is taken in the direction of arrow A in FIG. 7.

FIG. 7 is a schematic view showing an embodiment of the skew adjustment mechanism of the scanner, and FIG. 8 is a view taken in the direction of arrow A. As illustrated in FIG. 3A, concerning the second carrier 20, the deviation of the rotational direction (roll direction R) is adjusted with respect to the shaft S of the travel direction. That is, a guide hole 51 engaging with the guide shaft 46 is formed at the base end portion of the second carrier 20, and the second carrier 20 is guided along this guide shaft 46 in the scanning direction. At the other end portion of the second carrier 20, an eccentric shaft 52 is provided so as to extend in a direction perpendicular to the guide shaft This eccentric shaft 52 includes: a first shaft portion 52a engaged with the carrier main body; a second shaft portion 52b which is eccentric with respect to the shaft portion 52a, wherein a bearing 53 is attached to the second shaft portion 52b; an arm 52c extending in a radial direction; and a conical protrusion 52d provided at a fore end of the arm 52c. The eccentric shaft 52 is held by a washer 54 and stop ring 55 provided at one end of the eccentric shaft 52, and pushed to the left in FIG. 7 by a spring 56, so that the protrusion 52d is engaged with one of the elongated holes 57a formed in a stopper member 57 fixed to the carrier main body. As illustrated in FIG. 8, a large number of elongated holes 57a are formed on a semi circle, the center of which is the same as that of the shaft portion 52a (shown in FIG. 7) of the eccentric shaft 52. The end portion of the eccentric shaft 52 on the bearing 53 side is held by a "C" ring 58 so that the bearing 53 cannot be detached from the eccentric shaft 52. Further, the end portion of the eccentric shaft 52 on the bearing 53 side is provided with a driver groove 52e. The bearing 53 is supported in such a manner that the bearing 53 can roll on a guide rail 47 fixed to a frame (not shown) of the image scanner.

Due to the construction described above, the operation is conducted in the following manner: A driver (not shown) is inserted into the driver groove 52e, so that the eccentric shaft 52 is pushed to the right in FIG. 7 by the driver against the force of the spring 56. Therefore, the protrusion 52d provided at the fore end of the arm is disengaged from the elongated hole 57a, and when the eccentric shaft 52 is rotated by a predetermined angle, the protrusion 52d is engaged with another elongated hole 57a by the force of the spring 53. Since the shaft portions 52a, 52b of the eccentric shaft 52 are eccentric to each other, the second carrier 20 can be entirely adjusted in the direction of arrow R around the guide shaft 46.

As described above, an amount of skew adjustment of the carrier in the rolling direction is determined by an amount of eccentricity between the shaft portions 52a, 52b of the eccentric shaft 52, and also determined by an angular pitch of the elongated holes 57a. Accordingly, corresponding to an amount of skew caused between the right and left portions of a document placed on the platen (not shown), an amount of eccentricity of the eccentric shaft 52 and an angular pitch of the elongated holes 57a are determined.

Figure 9:
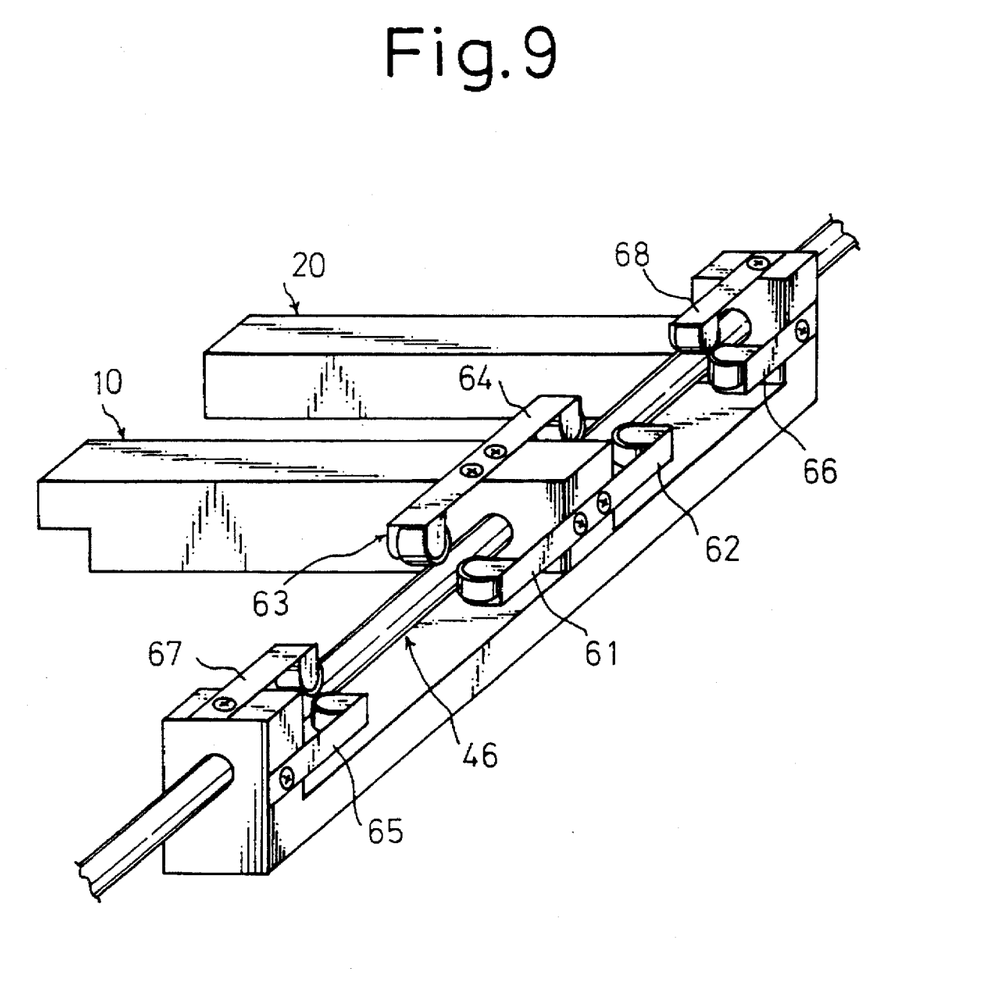
FIG. 9 is a perspective view of the mechanism for suppressing the deviations, in the pitch and yaw directions of the carrier.

FIG. 9 shows a mechanism for suppressing the deviation of the carrier in the pitch and yaw directions. The deviation of the first carrier 10 in the yaw direction is suppressed by pinch rollers 61, 62 provided at an arm of the end portion of the first carrier 10, wherein the pinch rollers 61, 62 are disposed horizontally to contact the guide shaft 46. Also, the deviation of the first carrier 10 in the pitching direction is suppressed by pinch rollers 63, 64 provided at the arm of the end portion of the first carrier 10, wherein the pinch rollers 63, 64 are disposed vertically to contact the guide shaft 46.

On the other hand, the deviation of the second carrier 20 in the yaw direction is suppressed by two pinch rollers 65, 66 horizontally in contact with the guide shaft 46, wherein the two pinch rollers 65, 66 are disposed straddling the first carrier 10. Also, the deviation of the second carrier 10 in the pitching direction is suppressed by two pinch rollers 67, 68 vertically coming into contact with the guide shaft 46, wherein the two pinch rollers 67, 68 are disposed straddling the first carrier 10.

Figure 10:
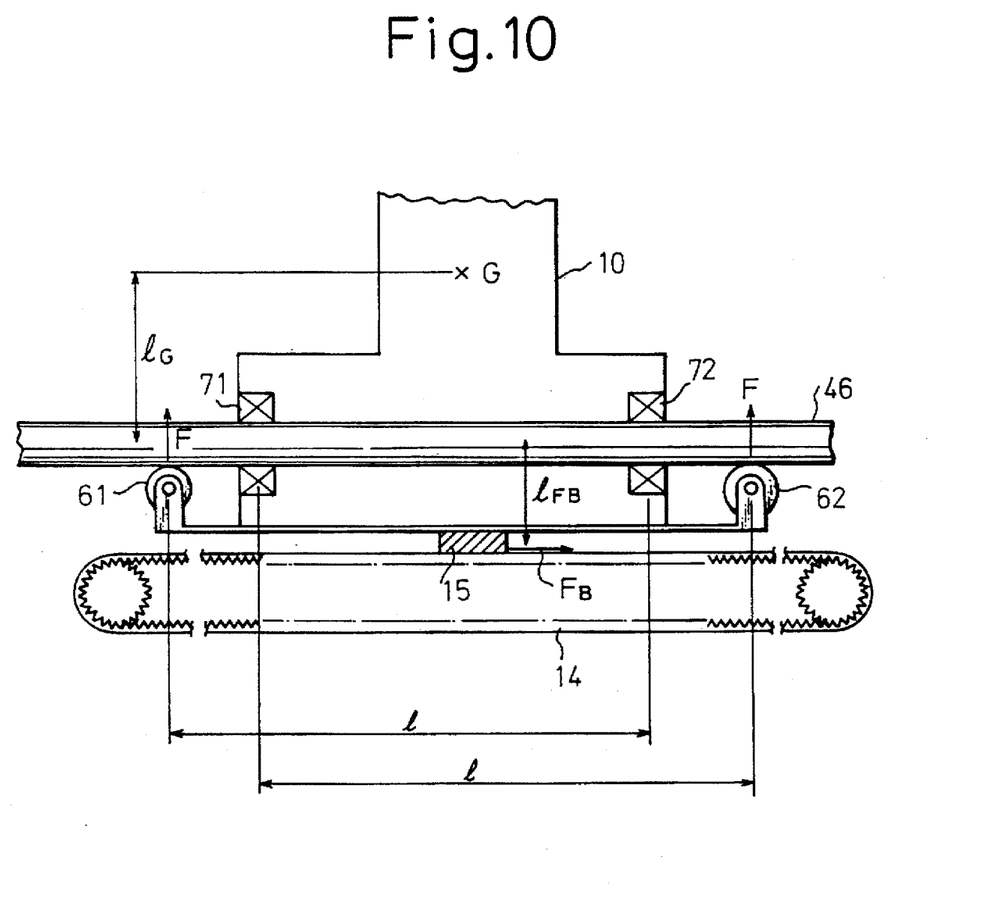
FIG. 10 is a view for explaining the load setting of the pinch roller of the carrier.

FIG. 10 is a view for explaining the setting of a load given to the pinch rollers in the mechanism for suppressing the deviation of the carrier shown in FIG. 9. FIG. 10 illustrates the load of the pinch roller used for suppressing the deviation of the first carrier in the yaw direction. In the drawing, numeral 10 is the first carrier, numeral 14 is a drive belt, numeral 15 is a fixing portion at which the belt 14 and the first carrier 10 are fixed, numeral 46 is a guide shaft, numerals 61, 62 are pinch rollers, numerals 71, 72 are thrust bearings. The load given to each pinch roller is determined in the following manner.

$$F \times 1 > F_B \times 1_{FB} G \times \alpha \times 1_G$$

where F: Pinching load

1: Distance between the pinch roller and the bearing in the direction of the shaft $F_B$: Belt tension $1_{FB}$: Distance between the belt and the shaft in the direction perpendicular to the shaft G: Load of the carrier α: Acceleration impressed upon the carrier $1_G$: Distance between the center of gravity and the shaft in the direction perpendicular to the shaft.

When the pinch roller is set so that the pinch load can satisfy the above expression, movement of the optical axis caused by the deviation of pitch and yaw can be suppressed under the condition of the dimensions, weight and the maximum acceleration of the system. Therefore, image quality can be improved even when the image may be blurred due to the deviation of the carrier caused by stoppage, start and sudden acceleration. In this connection, with reference to FIG. 10, suppression of the deviation of the first carrier 10 in the yaw direction is explained above, however, suppression of the deviation of the first carrier 10 in the pitch direction can be made in the same manner. The conditions of the second carrier are the same as those of the first carrier.

Figure 11:
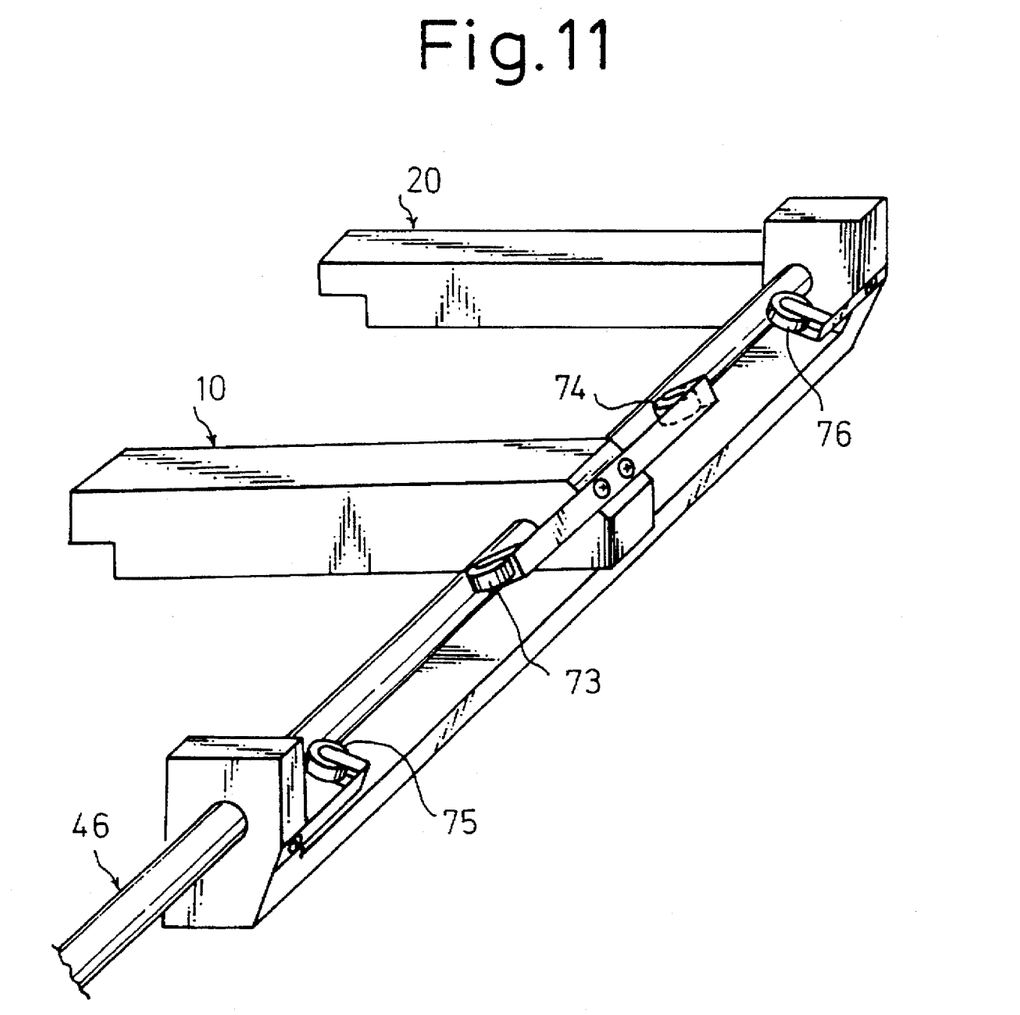
FIG. 11 is a perspective view of the mechanism for suppressing the deviations of pitching and yawing directions of another embodiment.

FIG. 11 shows an embodiment of the mechanism for suppressing the deviation of the carrier in the pitch and yaw directions in which the mechanism shown in FIG. 9 is improved. In this embodiment, adjustment of the carrier in the yaw direction and that in the pitch direction are made by the same rollers. That is, adjustment of the first carrier in the yaw direction and that in the pitch direction are made by pinch rollers 73, 74 disposed at the base end of the arm of the first carrier 10 in such a manner that each of the pinch rollers 73, 74 comes into contact with an upper lateral position of the guide shaft 46 forming an angle of about 45°. On the other hand, suppression of the deviation of the second carrier 20 in the yaw direction and that in the pitch direction are made by two pinch rollers 75, 76 disposed straddling the first carrier 10, wherein each of the pinch rollers 75, 76 comes into contact with a lower transverse position of the guide shaft 46 at an angel of about 45°. In this case, the setting load of the pinch roller is determined so that a necessary load can be given in each of the pitch and yaw directions in the form of a component force. According to this embodiment, it is possible that the number of substantially assembled pinch rollers is reduced, and also the volumes of the first and second carriers 10, 20 can be reduced.

Embodiments of the present invention have been explained above with reference to the accompanying drawings, however, it should be understood that the present invention is not intended to be limited to the specific embodiments, and variation may be made by one skilled in the art without departing from the spirit and scope of the invention.

For example, in the above embodiments, the two-carrier type image scanners are mainly explained, however, it is possible to apply the present invention to the one-carrier type image scanner. Also, it is possible to appropriately select the number of the pinch rollers 61 to 68, and the number of the pinch rollers 73 to 76, the interval of pinch roller arrangement, and the direction of the pinch rollers.

It should also be noted that the skew adjustment mechanism explained above with reference to FIGS. 7 and 8 and the mechanism for suppressing the deviation of carrier in the pitch and yaw directions explained above with reference to FIG. 9 or FIG. 11 are also be applicable to any other carrier system than the image scanner.

As explained above, in the image scanner according to the present invention, adjustment can be easily made by a simple construction with respect to the roll, yaw and pitch directions of the carrier. Due to the foregoing, it is possible to provide an image scanner in which the adjustments of the carrier in the roll, yaw and pitch directions can be made by a simple construction, so that the deviation of the carrier can be suppressed in the case of a sudden start or stop, blurred images can be avoided and the reading speed can be increased.

I claim:

1. An image scanner, which optically reads out image information such as figures and characters on a document surface using an optical system mounted on at least one carrier movable in a first direction with respect to the image scanner body, said image scanner characterized in that:

one side of said carrier is movably engaged with a fixed guide shaft extending in the first direction; and a second, opposite side of said carrier is guided along a fixed guide rail disposed in parallel with said guide shaft, said carrier including pinch rollers coming into contact with said fixed guide shaft, said pinch rollers being disposed at an engaging portion of said carrier which engages said fixed guide shaft, and wherein deviation of the carrier in the yaw and pitch directions is suppressed by adjusting pinching loads of the pinch rollers with respect to the fixed guide shaft.

2. An image scanner according to claim 1, wherein the pinch rollers for adjusting the deviation in the yaw direction of the carriers are disposed so that the pinch rollers come into contact with a side portion of the fixed guide shaft, and the pinch rollers for suppressing the deviation in the pitch direction of the carrier are disposed so that the pinch rollers come into contact with an upper or lower portion of the fixed guide shaft.

3. An image scanner according to claim 2, wherein the pinch rollers for suppressing the deviation of the carrier in the yaw and pitch direction are disposed so as to come into contact with an upper lateral or lower lateral position of the fixed guide shaft, each forming an angle of about 45° relatively to the document surface.

4. An image scanner according to claim 1, further comprising a timing belt connected with said one side of the carrier at a position close to the fixed guide shaft and driving the carrier along the fixed guide shaft, and the second side of the carrier being not driven.

5. A two-carrier type image scanner in which a first carrier is moved at a scanning speed and a second carrier is moved at half the scanning speed, in parallel to a document surface and commonly in a first direction, said image scanner optically reading out image information such as figures and characters on a document surface using an optical system mounted on the carriers, said image scanner characterized in that:

one side of each of said carriers is movably engaged with a fixed guide shaft extending in the first direction; and a second, opposite side of each of said carriers is guided along a fixed guide rail disposed in parallel with said guide shaft, said first and second carriers including respective, first and second pinch rollers coming into contact with said fixed guide shaft and disposed at corresponding engaging portions of said first and second carriers which engage said fixed guide shaft, and wherein deviation of each said carrier in the yaw and pitch directions is suppressed by adjusting pinching loads of the pinch rollers with respect to the fixed guide shaft.

6. An image scanner according to claim 5, wherein the pinch rollers for adjusting the deviation in the yaw direction of the respective carriers are disposed so that the pinch rollers come into contact with a side portion of the fixed guide shaft, and the pinch rollers for suppressing the deviation in the pitch direction of the respective carriers are disposed so that the pinch rollers come into contact with an upper or lower portion of the fixed guide shaft.

7. An image scanner according to claim 6, wherein the pinch rollers for suppressing the deviation of the respective carriers in the yaw and pitch direction are disposed so that the pinch rollers come into contact with an upper lateral or lower lateral position of the fixed guide shaft, each forming an angle of about 45° relatively to the document surface.

8. An image scanner according to claim 5, including:

a single fixed guide shaft for guiding the first and second carriers; and first and second timing belts respectively connected with corresponding sides of the respective first and second carriers, each at a position close to the fixed guide shaft, wherein the carriers are driven along the fixed guide shaft by the timing belts, and the second side of each of the carriers is not driven.

9. An image scanner according claim 8, said first and second timing belts are connected to a common drive motor through respective first and second drive pulleys and one of said pulleys has a diameter of D and other of said pulleys has a diameter of D/2 so that said one of said two carriers moves along said fixed guide shaft at a speed of V and the other of said two carriers moves along the same fixed guide shaft at a speed of V/2.

10. An image scanner, which optically scans and thereby reads image information from a document surface disposed in a scanning plane, comprising:

a first guide having an axis disposed parallel to the scanning plane and extending in a first direction;

an optical system carrier having a first end engaging the first guide and movable therealong in the first direction and having a second end displaced from the first end;

a second guide disposed in the first direction, parallel to and spaced from the first guide, the second end of the carrier being guided on the second guide; and pinch rollers disposed on the first end of the carrier and engaging the first guide, transversely to the axis thereof and with a selectively variable pinch load, deviation of the carrier in yaw and pitch directions being suppressed by adjusting the pinching load of the pinch rollers with respect to the first guide.

11. An image scanner as recited in claim 10, wherein the pinch rollers further comprise:

a first pair of pinch rollers engaging the first guide at spaced locations along the first guide axis and imposing a first, adjustable pinching load thereon, directed transversely to the first guide axis and parallel to the scanning plane, the pinching load being adjusted so as to suppress yaw deviation of the carrier; and a second pair of pinch rollers engaging the first guide at spaced locations along the first guide axis and imposing a second adjustable pinching load thereon, directed transversely to both the first guide axis and the scanning plane, the second pinching load being adjusted to suppress pitch deviation of the carrier.

12. An image scanner as recited in claim 10, wherein yaw deviation comprises rotation about a yaw axis which extends transversely to both the first guide axis and the scanning plane and pitch deviation comprises rotation about a pitch axis which extends transversely to the first guide axis and parallel to the scanning plane and wherein the pinch rollers further comprise:

a first pair of pinch rollers engaging the first guide at symmetrically spaced locations, relatively to the yaw axis and imposing a first adjustable pinching load thereon, directed transversely to the first guide axis and parallel to the scanning plane, the first pinching load being adjusted so as to suppress yaw deviation of the carrier; and a second pair of pinch rollers engaging the first guide at symmetrically spaced locations along the first guide axis, relatively to the pitch axis and imposing a second adjustable pinching load thereon, directed transversely to both the first guide axis and the scanning plane, the second pinching load being adjusted so as to suppress pitch deviation of the carrier.

13. An image scanner as recited in claim 10, wherein the pinch rollers engage the first guide and apply pinching loads thereto in a direction transverse to the axis of the drive shaft and at an angle of approximately 45° relative to the scanning plane.

14. An image scanner as recited in claim 13, wherein the pinch rollers engage the first guide on a surface thereof disposed toward the scanning plane and correspondingly extend from the first guide and toward the scanning plane.

15. An image scanner as recited in claim 13, wherein the pinch rollers engage the first guide on a surface thereof remote from the scanning plane and correspondingly extend from the first guide and away from the scanning plane.

16. An image scanner according to claim 10, further comprising a timing belt connected to the first end of the carrier at a position close to the first guide and driving the carrier along the first guide, the second end of the carrier being not driven.

17. An image scanner as claimed in claim 10, further comprising:

a bearing mounted on the second end of the carrier and disposed in rolling engagement on the second guide, the second end of the carrier being adjustable relative to the bearing and thereby movable in a rolling direction about the axis of the first guide.

18. An image scanner, which optically scans and thereby reads image information from a document surface disposed in a scanning plane, comprising:

a first guide having an axis disposed parallel to the scanning plane and extending in a first direction;

first and second optical system carriers having respective, corresponding first ends engaging the first guide in spaced relationship and movable therealong in the first direction and having respective, corresponding second ends displaced from the respective first ends thereof, the first carrier moving at a first scanning speed and the second carrier moving at a second scanning speed which is one-half the first scanning speed and both the first and second carriers moving in parallel to the scanning plane;

a second guide disposed in the first direction, parallel to and spaced from the first guide, the respective second ends of the first and second carriers being guided on the second guide; and first and second sets of pinch rollers respectively disposed on the corresponding first ends of the first and second carriers, respectively, and engaging the first guide, transversely to the axis thereof, with respective, first and second selectively variable pinching loads, deviation of the carrier in yaw and pitch directions being suppressed by adjusting the first and second pinching loads respectively of the first and second sets of pinch rollers with respect to the first guide.

19. An image scanner as recited in claim 18, wherein each of the first and second sets of pinch rollers further comprise:

a first pair of pinch rollers engaging the first guide at a first pair of spaced locations along the first guide axis and imposing a first, adjustable pinching load thereon directed transversely to the first guide axis and parallel to the scanning plane, and the pinching load being adjusted so as to suppress yaw deviation of the carrier; and a second pair of pinch rollers engaging the first guide at a second pair of spaced locations along the first guide axis and imposing a second, adjustable pinching load thereon directed transversely to both the first guide axis and the scanning plane, the second pinching load being adjusted to suppress pitch deviation of the carrier.

20. An image scanner as recited in claim 19, wherein:

the first optical system carrier has a first end engaging the first guide;

the second optical system carrier has a pair of first ends engaging the first guide at spaced locations therealong with the first end of the first carrier disposed therebetween;

the respective pinch rollers of the first and second pairs of pinch rollers of the first set of pinch rollers engage the first end of the first carrier so as to dispose the respective pinch rollers of the first and second pairs thereof symmetrically, relatively to the end of the first carrier; and the first and second pairs of pinch rollers of the second set each comprise a first pinch roller mounted to one first end of the second carrier and a second pinch roller mounted to the second first end of the second carrier.

21. An image scanner as recited in claim 18, wherein:

the first set of pinch rollers comprises a pair of first and second pinch rollers mounted on the first end of the first carrier so as to engage the first guide at symmetrically displaced positions in the axial direction thereof relatively to the first end and angularly inclined so as to engage one of an upper surface and a lower surface of the first guide and form an angle of approximately 45° relatively to the scanning plane; and the second set of pinch rollers comprises a pair of first and second pinch rollers respectively and separately mounted to the first and second ends of the second carrier and extending therefrom so as to engage the first guide at symmetrically displaced positions along the axis thereof and along the other of the upper and the lower surface thereof and form an angle of approximately 45° relatively to the scanning plane and so as to be displaced by an angle of approximately 90° about the axis of the first guide from the first and second rollers of the first pair.

22. An image scanner as recited in claim 18, further including:

first and second timing belts respectively connected with corresponding first ends of the respective first and second carriers, each at a position close to the first guide, the carriers being driven along the first guide by the first and second timing belts and the second side of each of the carriers not being driven.

23. An image scanner as recited in claim 22, wherein said first and second timing belts are connected to a common drive motor through respective first and second drive pulleys and one of said pulleys has a diameter of D and other of said pulleys has a diameter of D/2 so that said one of said two carriers moves along the first guide at a speed of V and the other of said two carriers moves along the first guide at a speed of V/2.

24. An image scanner as recited in claim 18, further comprising:

first and second bearings mounted on the second ends of the first and second carriers, respectively, and disposed in rolling engagement on the second guide; and the second end of one of the first and second carriers being adjustable relative to the respective bearing and thereby movable in a rolling direction about the axis of the first guide.

* * * * *